July 4, 1961 C. M. GASSER 2,991,129
SAFETY BRAKE SYSTEM FOR TRAILERS
Filed Jan. 6, 1958
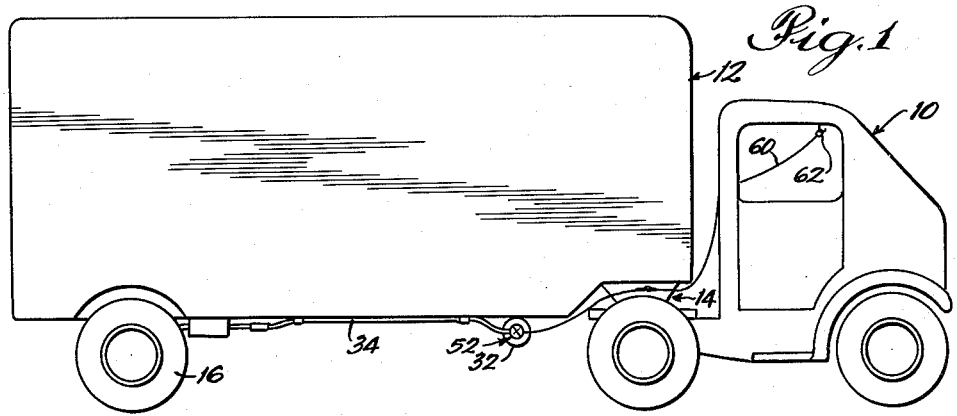
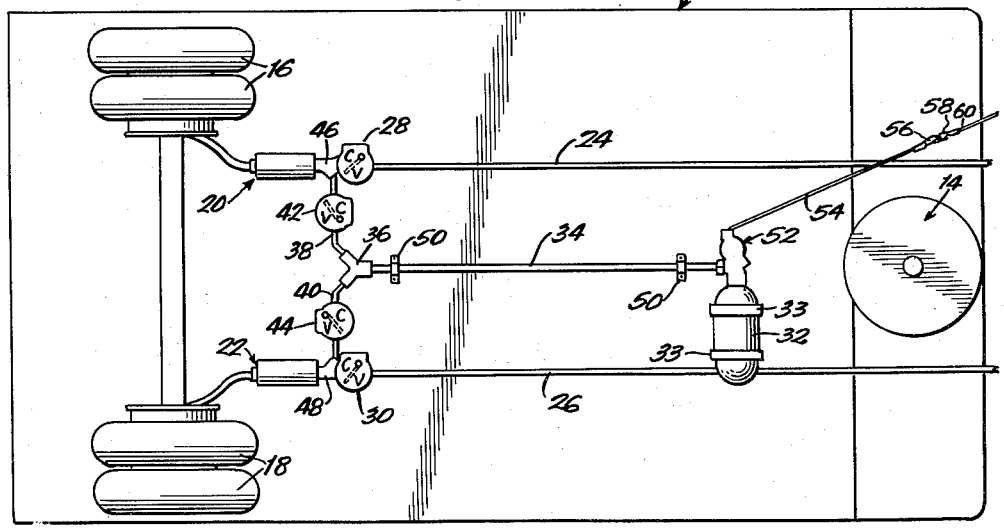
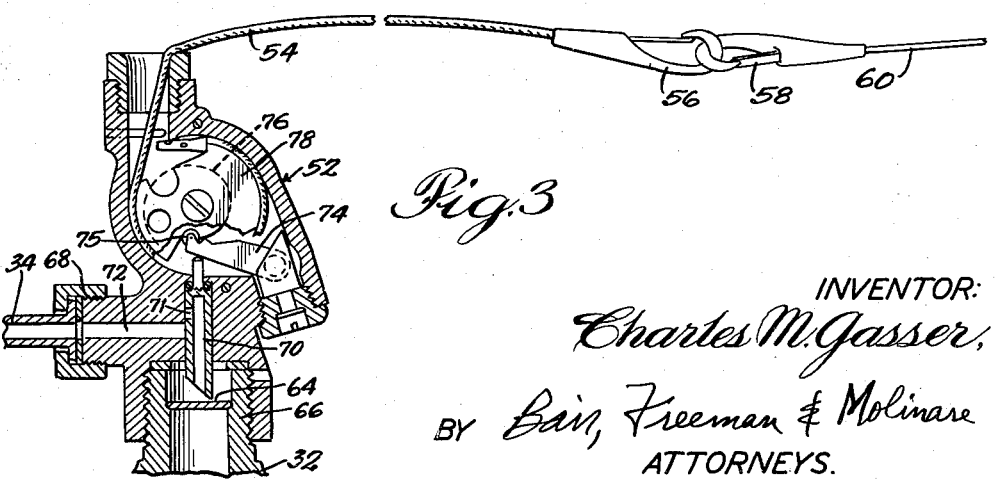
INVENTOR:
Charles M. Gasser,
BY Bair, Freeman & Molinare
ATTORNEYS.

United States Patent Office 2,991,129
Patented July 4, 1961

2,991,129
SAFETY BRAKE SYSTEM FOR TRAILERS
Charles M. Gasser, Dover, Ohio, assignor to Knapp-Monarch Company, St. Louis, Mo., a corporation of Delaware
Filed Jan. 6, 1958, Ser. No. 707,378
1 Claim. (Cl. 303—2)

This invention relates to a safety brake system for trailers and the like, and more particularly relates to the modification of existing trailer braking systems to provide safety braking means for the trailer.

The great use of truck-trailers for hauling cargo is well known. Throughout the years, the safety of use of such truck-trailers has steadily increased. However, statistics show that there still are a great number of instances of brake failure on such vehicles, or instances of separation, or breakaway, of the trailer from the truck. An uncontrollable, freely-moving trailer is, of course, highly dangerous both to the property carried therewithin, and to life and property alongside the road over which the trailer may be moving.

The importance of the problem of breakaway of a trailer from its towing vehicle has been pointed up by an order of the Interstate Commerce Commission, Ex Parte No. MC-40, dated May 21, 1956, which in effect requires the use of safety breakaway equipment on all trailers of the type which are required to be equipped with brakes. The said order of the ICC has given rise to a number of safety systems for use with electrically-energized brakes and hydraulically-operated brakes. However, the said safety systems are rather expensive to install.

The purpose of this invention is to provide a safety system for trailer brakes which meets the established ICC standards and which is easily and inexpensively adapted for use with existing liquid-operated or air-operated trailer braking systems.

Another object of this invention is to provide a safety brake system which is both automatically operable upon trailer breakaway, or is selectively manually operable in the event of emergency. Emergencies may occur when an air-line or fluid-line breaks, or when an air compressor fails to operate properly, or when there fails to exist an accumulation of compressed air that may be required for proper brake operation.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawings, in which:

FIGURE 1 is an illustration of a typical truck and trailer that may be equipped with the safety system of this invention.

FIGURE 2 is a bottom plan view of a trailer equipped with the safety system of this invention.

FIGURE 3 is a fragmentary enlarged cross-section view showing the cable-actuated piercing mechanism for the source of compressed gas.

Referring now to the drawings, there is shown in FIGURE 1 a wheeled truck 10 to which is connected a wheeled trailer 12 by the hitching mechanism generally indicated at 14. The trailer is provided with left wheels 16 and right wheels 18. The said wheels 16 and 18 are respectively provided with brakes which are to be energized by fluid-actuatable means generally indicated at 20 and 22, and of a type well known in the art. The fluid for actuation of the fluid-actuatable means may be a liquid such as an oil, but is normally compressed air which comes from a source that is generally mounted on the truck 10, as is well known in existing constructions. It is not believed necessary to show the compressor or reserve tank of compressed fluid that is mounted on truck 10. The compressed air is normally connected to the brake-actuating means 20 and 22 by means of flexible compressed air lines, which compressed air lines are seen in FIGURE 2. Thus far, what is described is existing structure and is well known in the art.

In the modified system herein disclosed the conduits 24 and 26 bring compressed air to the fluid-actuated means 20 and 22. As part of the modified system, there are provided primary check valves 28 and 30 respectively in conduits 24 and 26 upstream of the braking means 20 and 22. The check valves are of such nature as to permit fluid to pass freely from conduits 24 and 26 to braking means 20 and 22, but to prevent any substantial return flow through the check valves into conduits 24 and 26, other than that required to relieve pressure in means 20 and 22 to de-activate the brakes.

There is mounted on the under side of trailer 12 a replaceable compressed gas cartridge 32 which may be appropriately secured in position by means of a pair of straps 33 of the type which would permit withdrawal and substitution of a new cartridge 32 therein. More specifically, the compressed gas cartridge 32 is a heavy-walled container which preferably contains liquefied $CO_2$ gas. There is provided a conduit 34 leading from the compressed gas cartridge 32 to a Y-connector 36, from which there branches a pair of secondary conduits 38 and 40 leading respectively to one-way check valves 42 and 44, and thence into Y-connectors 46 and 48. The Y-connectors 46 and 48 each provide a pair of upstream connections to which primary and secondary fluid conduits are connected, and a single downstream connection which connects to a fluid-actuatable means 20 or 22. The conduit 34 is appropriately held in position on the bottom of the trailer 12 by means of strap connectors 50 which are secured to the bottom of the trailer by any appropriate connection.

The connection between the gas cartridge 32 and conduit 34 is effected by means of a combination piercing mechanism and connector generally indicated at 52, the piercing mechanism of which is adapted to be actuated by a pull-cable segment 54, which is carried on trailer 12 and which has a manually-operable connector 56 at the end thereof. The manually-operable connector 56 is of the well-known type which normally forms a closed loop and which may be manually opened to afford connection thereof to another looped member. A similar manual connector 58, for connection to connector 56, is provided attached to the terminal end of a pull-cable segment 60 which is carried on the truck 10. The cable segment 60 may be of a length to extend into the cab of truck 10, as seen in FIGURE 1, and may have thereon a manual gripping ring 62, which the truck driver may pull on to effect selective manual release of the compressed gas from cartridge 32, for the purpose of actuating the brake mechanisms 20 and 22 in the manner as hereafter disclosed.

From the foregoing description it will be understood that the conduits 24 and 26 constitute primary conduit means for supplying primary fluid under pressure from the truck to the fluid-actuatable means 20 and 22. The valves 28 and 30 are one-way check valves of the type which permits the fluid to flow from conduits 24 and 26 to the fluid-actuatable means 20 and 22. In the event of an emergency situation, the high-pressure fluid in cartridge 32 may be selectively released by the truck operator through pulling on cable 60, which pull is transmitted through cable 54. Or, in the event that the truck 10 and trailer 12 separate inadvertently, the attached cables 60 and 54 act automatically to release the high-pressure gas from cartridge 32.

The high-pressure gas from cartridge 32 is conducted through conduit 34, through secondary conduits 38 and 40 and valves 42 and 44 and through Y-connectors 46 and 48 to the fluid-actuatable means 20 and 22. The presence of the one-way check valves 42 and 44 prevents the primary fluid in conduits 24 and 26 from normally entering into conduit 34. Similarly, the one-way valves 28 and 30 prevent the secondary fluid in conduit 34 from entering into primary conduits 24 and 26. Further, in the event that the conduits 24 and 26 are ruptured, the check valves 28 and 30 provide an effective closure to restrict leakage of the secondary fluid from the fluid-actuatable means 20 and 22.

It will be understood that by disconnecting the manual connectors 56 and 58, the supply of safety fluid may be inactivated to permit desired separation of the truck 10 from the trailer 12. Also, once the secondary gas supply has been used, the cartridge 32 may be discarded and a fresh cartridge of compressed gas may be easily substituted.

In order to disclose one type of operative means for releasing the fluid from cartridge 32, there is shown in FIGURE 3 the details of a typical device which may be used to effect positive piercing of a sealed cartridge 32 and to effect release of the contents of the cartridge 32 to the conduit 34. As seen in FIGURE 3, the cartridge 32 is provided with a pierceable cap 64 across the threaded neck 66 of cartridge 32. The piercing mechanism is carried in connector 52 which threadably connects to the neck 66 of cartridge 32. The connector 52 also provides a threaded boss 68 for connection to conduit 34. There is provided a hollow piercing needle 70 which is arranged to be moved against diaphragm 64 to pierce same, thereby permitting the release of fluid under pressure through the hollow needle 70, and through the lateral opening 71 in needle 70 and into passageway 72 leading to conduit 34.

The piercing needle 70 is positively actuated downwardly to pierce diaphragm 64 by means of a pivoted lever 74 which is normally biased upwardly by a spring and which is arranged to engage the upper end of needle 70. The lever 74 carries a cam-follower 75 and lever 74 is forced downwardly by the cam 76 which rotates with a sheave 78 about which the terminal end of cable segment 54 is wound, as seen in FIGURE 3. Similar types of positive actuation systems for effecting the piercing of compressed gas cartridges are well known in the art.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States is:

A braking system for a truck and wheeled trailer comprising, in combination, fluid-actuatable means on the trailer for braking the trailer's wheels, primary conduit means for supplying primary fluid under pressure to said fluid-actuatable means, primary check-valve means in said primary conduit means upstream of said fluid-actuatable means, secondary conduit means separate from said primary conduit means and adapted for supplying secondary fluid under pressure directly to said fluid-actuatable means downstream of said primary check-valve means, for the purpose of braking the trailer's wheels regardless of the presence of primary fluid in said primary conduit means, secondary check-valve means in said secondary conduit means, separate from said primary check-valve means, for normally preventing flow of primary fluid through said secondary conduit means, a replaceable normally sealed cartridge of gas under high pressure carried on said trailer, said gas under high pressure serving as the secondary fluid, a selectively actuatable cartridge-piercing mechanism detachably connected to said sealed cartridge of gas and arranged to release the high-pressure gas from said cartridge into said secondary conduit means, and gas-release means for operating the cartridge-piercing mechanism to release the high pressure gas from the cartridge either automatically when the truck and trailer separate and move apart from each other, or selectively as desired by the truck operator in the cab of the truck, said gas-release means including a truck-carried cable segment and a trailer-carried cable segment, and a manually-operable connector carried by at least one of said cable segments and affording selective connection and disconnection of said cable segments.

References Cited in the file of this patent
UNITED STATES PATENTS

| 2,759,569 | Keehn | Aug. 21, 1956 |
| 2,776,734 | Hackett | Jan. 8, 1957 |
| 2,814,363 | Phillips | Nov. 26, 1957 |

FOREIGN PATENTS

| 548,727 | Great Britain | Oct. 22, 1942 |